(12) United States Patent
Morein

(10) Patent No.: US 6,532,515 B1
(45) Date of Patent: Mar. 11, 2003

(54) METHOD AND APPARATUS FOR PERFORMING SELECTIVE DATA READS FROM A MEMORY

(75) Inventor: Stephen L. Morein, Cambridge, MA (US)

(73) Assignee: ATI International SRL, Barbados (KN)

( * ) Notice: Subject to any disclaimer, the term of this patent is extended or adjusted under 35 U.S.C. 154(b) by 6 days.

(21) Appl. No.: 09/630,914

(22) Filed: Aug. 2, 2000

(51) Int. Cl.[7] .......................... G06F 12/00; G06F 13/00
(52) U.S. Cl. ...................... 711/105; 711/154; 345/538
(58) Field of Search ........................ 711/100, 105, 711/145, 154, 163, 170–173, 202; 710/127; 345/501, 506, 422, 564, 589, 593, 549, 538, 550; 365/203.01, 203.03

(56) References Cited

U.S. PATENT DOCUMENTS 5,606,347 A * 2/1997 Simpson ..................... 345/550
5,946,005 A * 8/1999 Chiang et al. ............... 345/501
5,991,186 A * 11/1999 Balistreri et al. ...... 365/230.03
6,067,090 A * 5/2000 Sreenivas et al. ........... 345/589

OTHER PUBLICATIONS

Deering, Michael F.; Schlapp, Stephen A., and Lavelle, Michael G., Fbram: A new Form of Memory Optimized for 3D Graphics, Sun Microsystems Computer Corporation, Jul., 1994.

* cited by examiner

Primary Examiner—Matthew Kim
Assistant Examiner—Zhuo H. Li
(74) Attorney, Agent, or Firm—Vedder, Price, Kaufman & Kammholz

(57) ABSTRACT

A method and apparatus for performing selective data reads from a memory are presented. A memory command is received from a requesting entity, and a memory address is derived from the memory command. The memory address is then applied to a memory array that stores a plurality of data packets, where the memory array outputs a selected data packet in response to the memory address. Data selection control information is also derived from the memory command. The data selection control information is used to select a selected portion of the selected data packet. This selected portion is then packed into at least one data flit, which is sent over a bus to the requesting entity.

21 Claims, 4 Drawing Sheets

METHOD AND APPARATUS FOR PERFORMING SELECTIVE DATA READS FROM A MEMORY

FIELD OF THE INVENTION

The present invention relates generally to memory circuits, and more specifically to a method and apparatus for performing selected data reads from a memory array.

BACKGROUND OF THE INVENTION

Processing systems typically rely on memory structures to store data that is being processed. Such memory structures are often individual integrated circuits coupled to the processing circuitry. For a read operation that retrieves data from the memory, an address is applied to the memory circuit, and the data stored at that location is provided back to the requesting entity. The number of bits provided back to the requesting entity is typically based on the width of the data bus connecting the processor and the memory.

In some systems, it may be efficient to store related data in close addressing proximity within the memory array that supports the processing system. For example, in a graphics processing system that supports three-dimensional (3D) graphics processing, the frame buffer, which is stored in memory, typically stores color data and Z data for each pixel location. The Z data represents a depth coordinate value for the particular pixel location, where the depth is used in rendering operations to determine if a graphics primitive overlaps pixel data currently stored in the frame buffer, therefore modifying the color to be displayed for that pixel location. In order to facilitate blending operations in a video graphics processing system, the color data and the Z data for a pixel location may be stored together in the memory array. When the memory array is a dynamic random access memory (DRAM) array, block reads may be performed, where a block read provides color and Z data corresponding to a number of pixel locations.

As pixel processing rates increase, the available bandwidth on the bus structures that exchange data between a graphics processor and a memory circuit that stores the frame buffer can become a bottleneck in terms of the maximum pixel processing rate that can be achieved. Although additional signal lines can be added to these data buses to improve the data exchange rate, the additional pins on the integrated circuits required to support these signal lines add significant cost to the integrated circuits.

In many cases, the data retrieved from the memory circuit through a block transfer may include portions that are not needed by the graphics processor or similar processing circuit. However, due to the fact that block fetches occur, this data is retrieved along with the desirable data. As such, a portion of the limited bus bandwidth that is available is effectively wasted. For example, if color data is all that is desired by the graphics processor, which may be the case for generation of a display signal, retrieval of the Z data for each of the pixel locations through block transfers from the memory circuit to the graphics processor wastes valuable bandwidth on the bus.

Therefore, a need exits for a method and apparatus for performing selected data reads from a memory such that available bandwidth over interconnecting bus structures is efficiently utilized.

DETAILED DESCRIPTION

Generally, the present invention provides a method and apparatus for performing selective data reads from a memory. A memory command is received from a requesting entity, and a memory address is derived from the memory command. The memory address is then applied to a memory array that stores a plurality of data packets, where the memory array outputs a selected data packet in response to the memory address. Data selection control information is also derived from the memory command. The data selection control information is used to select a selected portion of the selected data packet. This selected portion is then packed into at least one data flit, which is sent over a bus to the requesting entity.

By enabling memory commands to select relevant data from a data packet, or block of data retrieved from the memory array, unwanted or unneeded data is not sent to the requesting entity over the bus. As such, buses of limited bandwidth can be utilized while still providing adequate data transfer rates required in systems such as graphics processing systems. This helps to limit the pin count on both the processor requesting data from the memory circuit as well as the pin count on the memory circuit itself.

Figure 1:
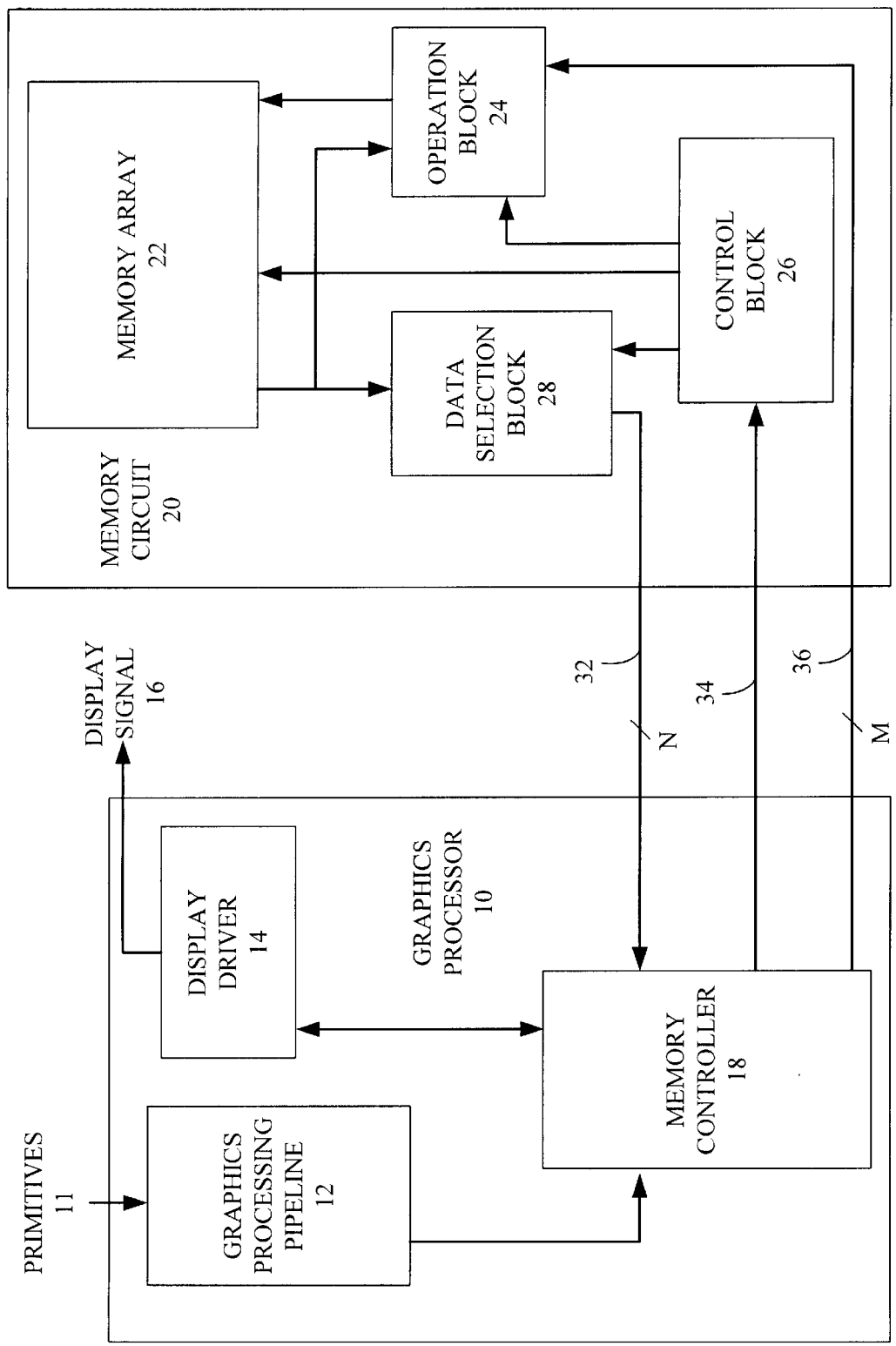
FIG. 1 illustrates a block diagram of a graphics processing system in accordance with a particular embodiment of the present invention.

The invention can be better understood with reference to FIGS. 1–4. FIG. 1 illustrates a block diagram of a graphics processing system 5 that includes a graphics processor 10 and a memory circuit 20. The graphics processor 10 receives graphics primitives 11 and processes them using a three-dimensional pipeline 12 to generate pixel fragments. The pixel fragments are then provided to memory controller 18, which forwards the pixel fragments to the memory circuit 20.

The bus 36 over which the memory controller 18 forwards the pixel fragments to the memory circuit 20 may be an M-bit wide bus 36 that is dedicated to carrying data traffic from the graphics processor 10 to the memory circuit 20. A similar N-bit wide data bus 32 is used to transfer data from the memory circuit 20 back to the graphics processor 10 (M and N are integers). In graphics processing applications, a large number of pixel fragments are typically generated and processed for a single display frame.

Thus, the 3D pipeline 12 typically generates a large number of fragments that are transferred to the memory circuit 20 for blending before the display driver 14 begins fetching the resulting image data from the memory circuit 20 in order to generate the display signal 16.

Because more data traffic is expected from the graphics processor 10 to the memory circuit 20, the M-bit wide bus 36 may provide more bandwidth than the N-bit wide bus 32. A control bus 34, which may be unidirectional or bidirectional, may provide a means for communicating command and control information between the graphics processor 10 and the memory circuit 20.

Within the memory circuit 20, an operation block 24 receives the pixel fragments over the M-bit wide bus 36. The operation block 24 can include an input buffer or other storage means such that data received over the M-bit bus 36 can be arranged into a desired format prior to a performance of operations, such as blending operations. The operation block 24 may receive command information from a control block 26, where the command information may be derived by the control block 26 from memory commands received from the memory controller 18 over the command bus 34.

For a blending operation, the operation block 24 receives a stored data packet from the memory array 22, where the stored data packet may include pixel data corresponding to a number of pixel locations. The operation block 24 can blend this pixel data with received pixel fragments corresponding to the appropriate pixel locations. In order to facilitate such blending operations, pixel fragments may be sent over the M-bit wide bus 36 in a manner that allows for reconstruction of fragment blocks in the operation block 24. A fragment block is a data packet that preferably includes a number of pixel fragment locations that is equal to the number of pixels worth of data that is received in a data packet retrieved from the memory array 22. Some or all of the pixel fragment locations may be filled locations, or those that contain a valid pixel fragment for blending.

The operation block 24 may perform blending operations for an entire data packet simultaneously such that processing efficiency is increased. Thus, the operation block 24 may perform individual Z comparisons for fragments received with stored pixel data, and once the resulting set of color and Z information from the blending operation has been determined for each pixel in the packet, the entire packet of resultant data is written back into the frame buffer within the memory array 22 in a single operation. Techniques for transferring data across the M-bit wide bus 36 and for performing blending and other operations within the operation block 24 are described in additional detail in copending patent application entitled "GRAPHICS PROCESSING SYSTEM WITH ENHANCED BUS BANDWIDTH UTILIZATION AND METHOD THEREFORE", Ser. No. 09/630,783, having a filing date of Aug. 2, 2000.

In order to allow for block blending of video graphics data by the operation block 24, the memory array 22, which may be a DRAM array, may be structured such that color data and Z data for a particular pixel location is fetched as a part of the same block fetch that retrieves the selected data packet from memory. Although such an arrangement of data within the memory array 22 is efficient in terms of performing fetching operations for blending pixel fragments with pixel data stored in the frame buffer, the storage arrangement is not as optimal for fetching color data from the frame buffer for generating a display signal 16.

In prior art systems, when the display driver 14 wanted to fetch color data from the memory array 22, the memory controller 18 issues a command for a data read from a particular location within the memory array 22. The data packet produced by that operation is then forwarded back to the memory controller 18, which forwards the data to the display driver 14. Unfortunately, such block transfers include both color data and Z data. If the bandwidth over the N-bit bus 32 is limited, the transference of the Z data as a part of the data packet is wasteful, and therefore undesirable as it may limit overall graphics processing performance.

In order to avoid the transference of unnecessary data across the N-bit bus 32, the memory circuit 20 includes a data selection block 28. The data selection block 28 receives the selected data packet from the memory array 22 as well as data selection control information from the control block 26. Based on the data selection control information, the data selection block 28 outputs a selected portion of the selected data packet. The data selection block 28 can group the selected portion of the selected data packet into data flits, where flit is an amount of data that can be sent across the N-bit bus 32 in parallel. Therefore, the data selection block 28 groups the selected portion of the selected data packet into N-bit flits, and each flit is then sent across the N-bit bus 32 to the memory controller 18. The memory controller 18 reconstructs the relevant portions of the data packet before providing them to the display driver 14 or any other requesting entity on the graphics processor 10.

Figure 2:
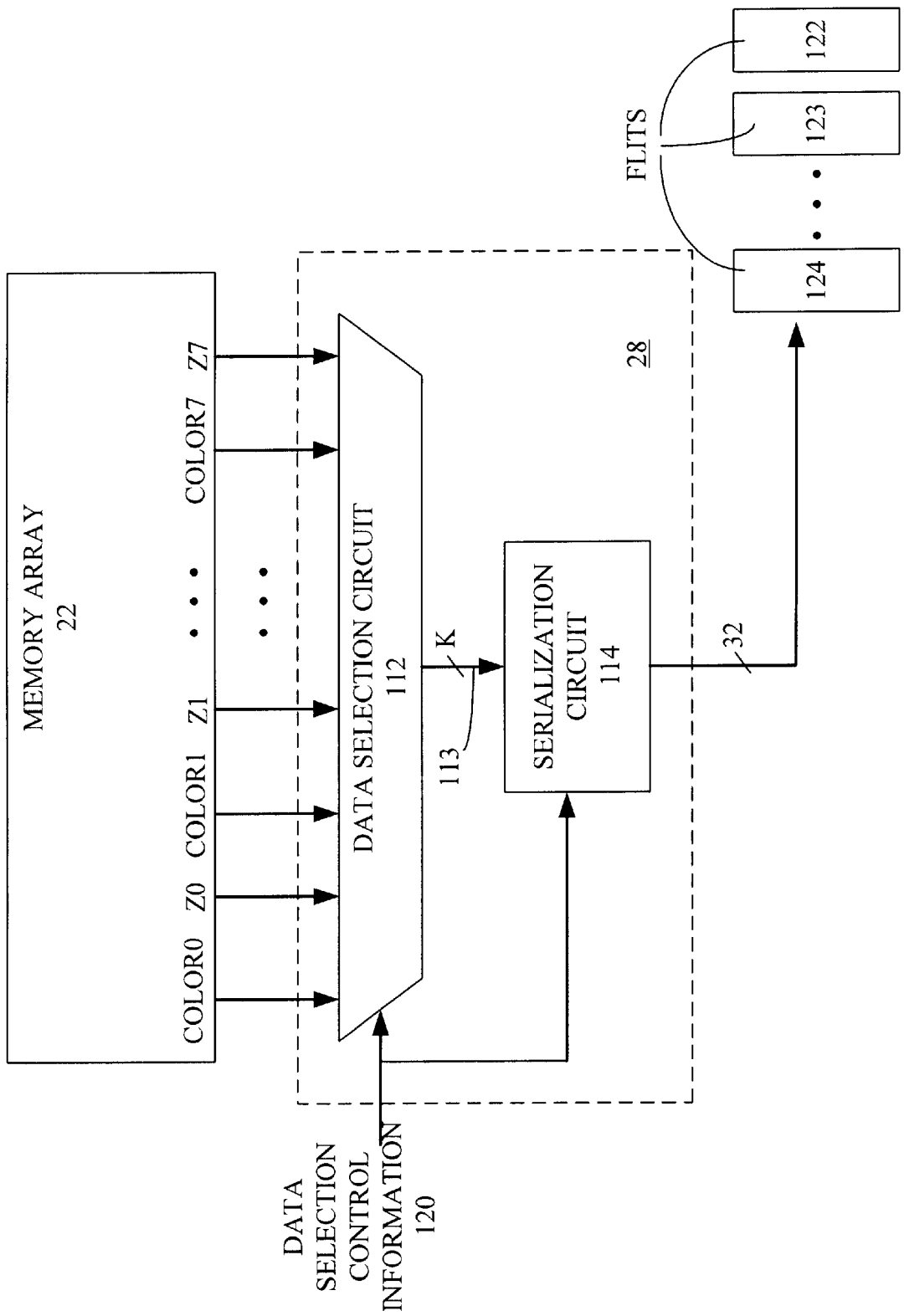
FIG. 2 illustrates a block diagram of a portion of a memory circuit in accordance with a particular embodiment of the present invention.

FIG. 2 illustrates the memory array 22 and the data selection block 28 in additional detail. In one embodiment, the memory array 22 is a DRAM array that generates 512 bits of information as the selected data packet that is retrieved for each memory read operation. Assuming that each pixel location in the frame buffer includes 32 bits of color information and 32 bits of Z information, each memory access to the memory array 22 includes enough bits to support 8 pixels.

The data selection block 28 includes a data selection circuit 112 and a serialization circuit 114. The data selection circuit 112 receives data selection control information 120 from the control block 26. The data selection control information 120 may indicate to the data selection circuit 112 that only the color information, only the Z information, or both the color and Z information are desired by the requesting entity. In other embodiments, the granularity with which the desired data can be selected may be greater than just a decision between Z and color data. For example, the data selection control information 120 may be a mask that selects specific bits from the bits provided from the memory array 22 to the data selection circuit 112.

The selected portion 113 of the selected data packet is K-bits wide, where the number K depends on the specific data selection control information 120 received by the data selection circuit 112. In one example, the data selection control information 120 may select only the color data for a particular selected data packet. In such an example, 256 bits of data would be included in the selection portion 113, and therefore K would be equal to 256.

The serialization circuit 114 also receives the data selection control information 120 such that the serialization circuit 114 is aware of the format of the data that it is responsible for packing into data flits. The serialization circuit 114 is coupled to the N-bit bus 32, and in the example illustrated in FIG. 2, N is equal to 32 such that the bus 32 is 32 bits in width. In such an example, each of the flits 122–124 generated by the serialization circuit 114 is 32 bits in width. Therefore, in order to convey the color data for a selected data packet back to the graphics processor 10, eight 32-bit flits would be required. In a prior art system that blindly sends the selected packet retrieved from the memory array back to the requesting entity, the Z information would also be sent, thus requiring sixteen 32-bit flits, which requires twice the time to traverse the bus.

Figure 3:
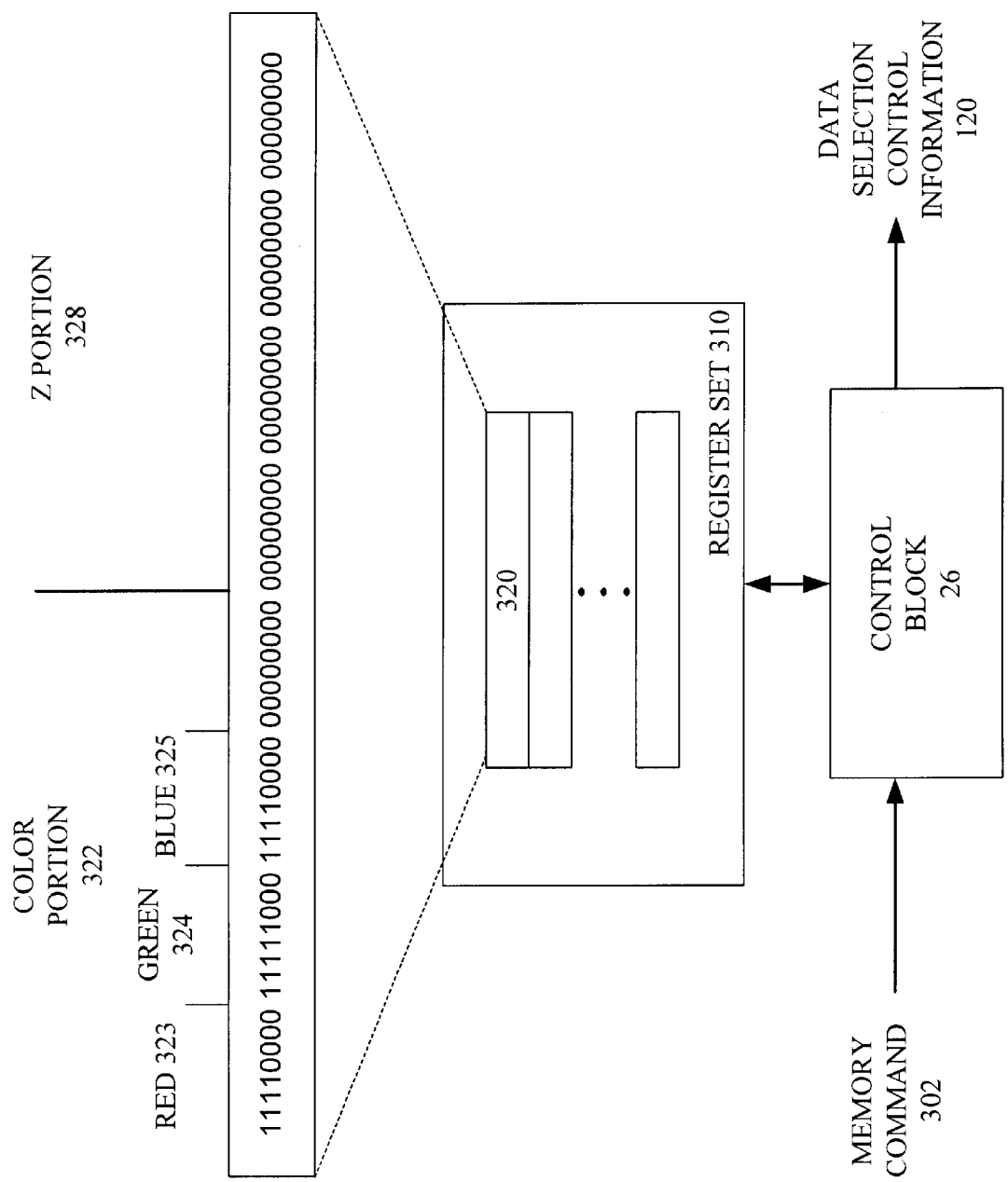
FIG. 3 illustrates a block diagram control block and associated register set used in a memory circuit that supports selected data reads in accordance with a particular embodiment of the present invention.

FIG. 3 illustrates a control block 26 that receives a memory command 302 and generates data selection control information 120 based on the memory command 302. In order to generate the data selection control information 120, the control block 26 may reference a register set 310, where the register set 310 may be included in the control block or stored externally from the control block 26. The register set 310 may include a single register or a plurality of registers. At least a portion of the memory commands received by the control block 26 include a register identity, where the control block 26 references a selected register of the plurality of selection registers included in the register set 310 based on the register identity to produce the data selection control information 120.

The control block 26 receives the memory command 302, which may include a portion that selects a particular register included in the register set 310 or simply indicates the data selection control information 120 to be generated. For example, each memory command may include an encoding that is understood by the control block 26, where the control block 26 can generate the data selection control information 120 based on the encoding. Thus, in one example, the memory command 302 may be a memory command that is associated with reading color data from the memory array 22. An encoding included within the memory command 302, such as a certain number of bits configured in a certain fashion, indicates that this is a read color command. As a result, the control block 26 generates data selection control information 120 that selects only color data included in the selected data packet.

In other embodiments, the memory command 302 may include a bit field that is used to reference a particular register included in the register set 310. Registers included in the register set 310 may include coarse or fine levels of data selection information. For example, if the selected data packet retrieved from the memory array includes 512 bits, each register including the register set 310 may include 8 bits, where each bit corresponds to a 64-bit portion of the selected data packet. In other embodiments, each register in the register set 310 may include as many as 512 bits, where each bit in such a bit mask corresponds to a single bit in the selected data packet.

An example register 320 that lies between the two example cases described immediately above is provided. The example register 320 includes a color portion 322 and a Z portion 328. In this specific case shown, the color portion 322 includes a red portion 323, a green portion 324, and a blue portion 325. In the example video graphics system, each of these colors is represented for each pixel by 8 bits of data within the frame buffer. A final 8 bits includes in the color portion 322 may be used for other pixel parameters such as an alpha value. Thus, the color portion 322 includes 32 bits, where 8 bits are dedicated to each of the three colors 323–325 and a final 8 bits are dedicated to another parameter such as alpha. The Z portion 328 may also include 32 bits of masking, where it is assumed that the register 320 is used to mask the color and Z data corresponding to each of the set of pixel data included in the selected data packet.

The register 320 may be configured through separate memory commands sent over the command bus 34. As such, configuring the register 320 to the appropriate masking values allows a requesting entity to select the color and/or Z data it desires with a high level of granularity. Not only can the requesting entity select just color or just Z data, but just red color data may also be selected. Furthermore, specific bits included in each of the separate color portions can also be selected by setting or clearing specific bits within each of the red, green, and blue portions 323–325. In the specific example illustrated, a value of one in the bit mask is stored in the register 320 corresponds to an indication that the corresponding data for a pixel in the selected data packet should be included in the selected data portion sent back to the requesting entity. As such, for the example illustrated, the four most significant bits of red color data, the five most significant bits of green color data, and the four most significant bits of blue color data for each pixel are included in the selected data portion sent back to the requesting entity. Thus, the inclusion of a bit mask in a selection register within the register set 310 allows for the selected portion of the selected data packet to include non-consecutive bits from the selected data packet.

Figure 4:
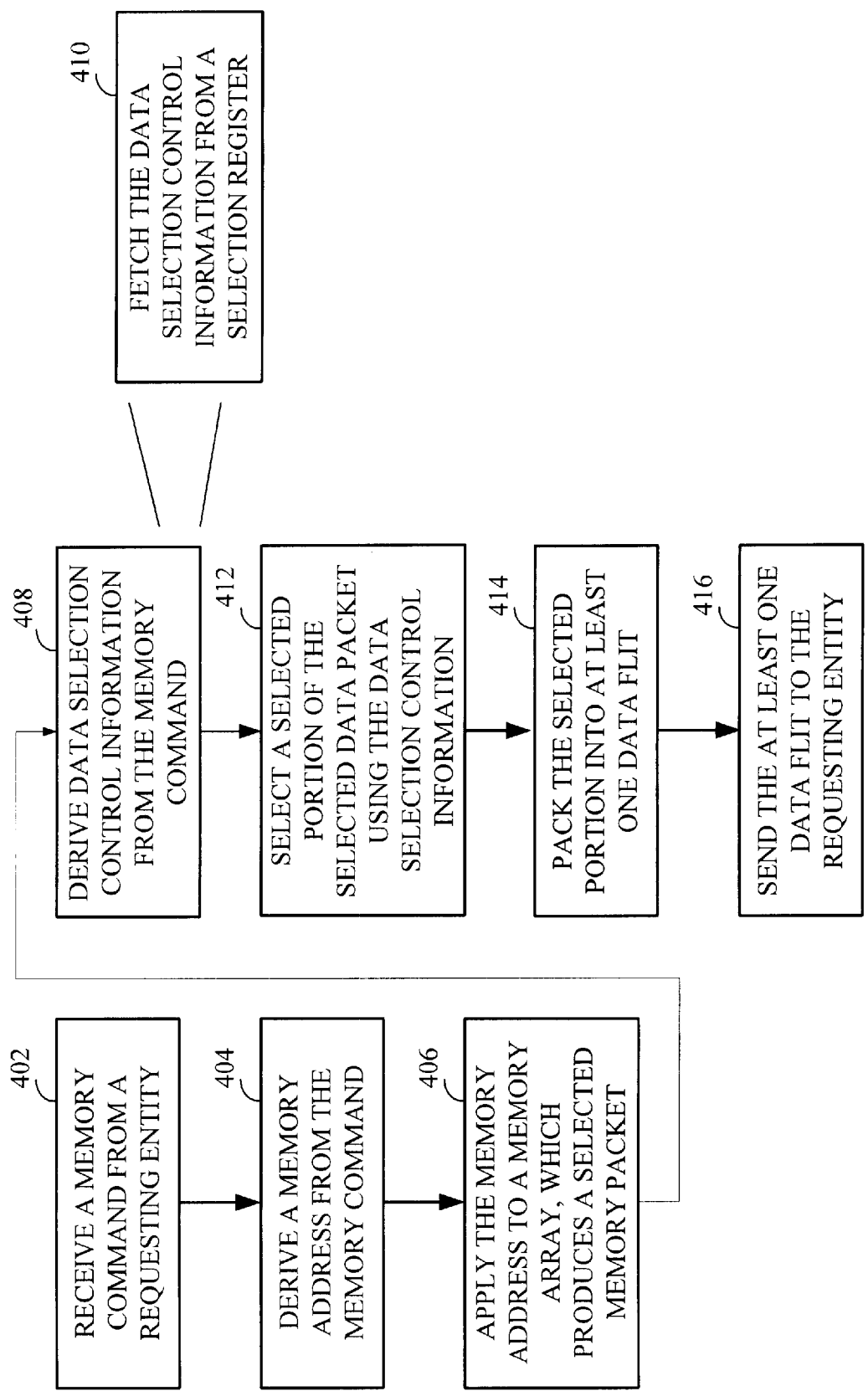
FIG. 4 illustrates a flow diagram of a method for performing selected data reads in accordance with a particular embodiment of the present invention.

FIG. 4 illustrates a flow diagram of a method for performing selective data reads from a memory. The method begins at step 402 where a memory command is received from a requesting entity. In one embodiment, the requesting entity may be a video graphics processor included in a computer system. In other embodiments, the requesting entity may be some other form of memory client that wishes to receive a selected portion of a block of data information that is retrieved from the memory during a memory access.

A memory command may include a starting address and a burst length such that multiple data packets can be selected from the memory array by a single memory command. For example, if a display driver wishes to retrieve all of the color data from a frame buffer stored in the memory array, the memory command can indicate a start address corresponding to a starting point within the frame buffer, and a burst length corresponding to the length of the frame buffer such that all of the data packets included in the frame buffer are fetched. By including data selection information in the memory command such that only color data is transferred across the bus to the graphics processor, the bandwidth required to flush the frame buffer to the display driver for display signal generation is effectively cut in half as the Z data which normally would be discarded by the display driver is not even sent across the connecting bus structure.

At step 404, a memory address is derived from the memory command. The memory command is assumed to include enough information such that the memory address can be derived from the memory command. In some embodiments, the address is simply carried over a portion of the signal lines that provide the memory command to the memory structure. In other embodiments, the command and address may be multiplexed over a limited number of command signal lines that couple the requesting entity and the memory circuit.

At step 406, the memory address is applied to a memory array that stores a plurality of data packets. In response to the application of the memory address, as well as control signals that indicate a read operation is taking place, the memory outputs a selected data packet. Preferably, the memory array is a DRAM memory array and a large number of bits are included in the selected data packet.

At step 408, data selection control information is derived from the memory command received at step 402. Derivation of the data selection control information may include fetching the data selection information from a data selection register at step 410. In some embodiments, the fetching performed at step 410 includes selecting a selected register of a plurality of registers, where the selected register is selected based on register selection information included in the memory command.

Each data selection register may store a bit mask, where each bit in the bit mask corresponds to at least one bit in the selected data packet. Thus, in some embodiments, a single bit in the bit mask may correspond to multiple bits within the selected data packet, where the multiple bits may be consecutive or non-consecutive bits. Thus, in an example, the bit mask may include 8 bits, and the selected data packet may include 512 bits. In one case, each bit of the 8 bits may correspond to a 64-bit consecutive portion of the selected data packet, whereas in another case, the 8-bit mask may be mapped across the 512 bits repeatedly such that the first bit of the bit mask corresponds to the first bit in the selected data packet, the ninth bit in the selected data packet, the seventeenth bit in the selected data packet, etc.

In one embodiment of the present invention, the selected data packet may include pixel data corresponding to a set of pixels. The data selection control information in such an embodiment may allow for selection between color portions and Z portions of the data corresponding to each of the pixels. As such, a requesting entity may request only the color portion, only the Z portion, or both the color and Z portions for each of pixels for which data is included in the selected data packet.

In other embodiments, the data selection information may be derived from the memory command by decoding a predetermined number of bits that are included in the memory command. For example, two bits included in the memory command can be used to encode four different types of data selection control information.

At step 412, a selected portion of the selected data packet is selected based on the data selection control information derived at step 408. The selected portion can include non-consecutive bits included in the selected data packet, and in the case of the selected data packet storing pixel data, the selected portion can include selected bits from at least one of the color portion and the Z portion for each pixel. Thus, in one example, the selected portion can include a select set of bits from the color portion for each of the pixels for which data is included in the selected data packet.

At step 414 the selected portion is packed into at least one flit. The size of the flits may be determined based on the width of the data bus over which the selected portion is to be conveyed. For example, if a 16-bit bus is used to convey the selected portion to the requesting entity, each flit may be 16 bits in size. The number of flits that are generated as a result of the packing operation is determined based on the amount of data included in the selected portion.

At step 416, the at least one flit generated at step 414 is sent to the requesting entity. Because the requesting entity generated the memory command, the requesting entity knows the format in which to expect the selected portion. As a result, no information as to how the selected portion is packed into the one or more flits needs to be conveyed to the requesting entity.

Although the present invention has been described with particular application toward video graphics applications, it should be understood that such method and apparatus for performing selective data reads from a memory may be useful in numerous other applications. The additional circuitry required on the memory circuit in comparison to conventional memory structures is minimal, while the bandwidth savings can be substantial. As a result, available bandwidth over bus structures coupling memory clients and memory circuits can be utilized more efficiently, which may allow the performance of the memory clients themselves to be enhanced. In other cases, the width of the data bus used to convey the data can be reduced, thus reducing integrated circuit pin count and cost.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A memory circuit, comprising:
    a memory array, wherein the memory array includes a plurality of locations, wherein each location of the plurality of locations in the memory array stores a data packet, wherein the memory array outputs a selected data packet in response to memory array control signals;
    a data selection block operably coupled to the memory array, wherein the data selection block receives data selection control information, wherein the data selection block receives the selected data packet from the memory array and outputs a selected portion of the selected data packet based on the data selection control information, wherein the selected portion is outputted by the data selection block as at least one flit wherein the data selection block includes a data selection circuit that selects the selected portion of the selected data packet based on the data selection control information;
    a data bus operably coupled to the data selection block, wherein the data bus conveys the at least one flit to a requesting entity; and
    a control block operably coupled to the memory array; the data selection block, and the data bus, wherein the control block receives memory commands from the requesting entity, wherein each memory command is processed by the control block to produce the memory array control signals and the data selection control information corresponding to the memory command.

2. The memory circuit of claim 1 wherein the data selection block includes:
    a data selection circuit that selects the selected portion of the selected data packet based on the data selection control information; and
    a serialization circuit that produce the at least one flit from the selected portion.

3. The memory circuit of claim 1 further comprises a selection register operably coupled to the control block and the data selection block, wherein the selection register stores selection information, wherein the control block uses the selection register to produce the data selection control information.

4. The memory circuit of claim 3, wherein the selection register includes a bit mask, wherein each bit of the bit mask corresponds to at least one bit in the selected data packet, wherein the data selection control information is derived from the bit mask.

5. The memory circuit of claim 3, wherein the selection register further comprises a plurality of selection registers that store selection information, wherein at least a portion of the memory commands received by the control block include a register identity, wherein the control block references a selected register of the plurality of selection registers based on the register identity to produce the data selection control information.

6. The memory circuit of claim 1, wherein the selected portion of the selected data packet includes non-consecutive bits included in the selected data packet.

7. The memory circuit of claim 1, wherein the memory array stores image data, wherein each data packet includes a color portion and a Z portion, wherein the selected portion includes at least one of the color portion and the Z portion of the selected data packet.

8. The memory circuit of claim 7, wherein the selected portion includes the color portion of the selected data packet.

9. The memory circuit of claim 7, wherein the selected portion includes the Z portion of the selected data packet.

10. The memory circuit of claim 7, wherein the color portion includes a red portion, a green portion, and a blue portion, wherein the selected portion includes selected bits from each of the red, green, and blue portions.

11. The memory circuit of claim 1, wherein the memory array is a dynamic random access (DRAM) memory array.

12. A method for performing selective data reads from a memory, comprising:
  receiving a memory command from a requesting entity;
  deriving a memory address from the memory command;
  applying the memory address to a memory array that stores a plurality of data packets, wherein the memory array outputs a selected data packet in response to the memory address;
  deriving data selection control information from the memory command;
  selecting a selected portion of the selected data packet received from the memory array, based on the data selection control information;
  packing the selected portion into at least one flit; and
  sending the at least one flit over a bus to the requesting entity.

13. The method of claim 12, wherein deriving data selection information further comprises fetching the data selection information from a data selection register.

14. The method of claim 13, wherein fetching the data selection information further comprises fetching the data selection information from a selected register of a plurality of registers, wherein the selected register is selected based on register selection information included in the memory command.

15. The method of claim 13, wherein the data selection register stores a bit mask, wherein each bit in the bit mask corresponds to at least one bit in the selected data packet.

16. The method of claim 12, wherein the memory array stores image data, wherein each data packet of the plurality of data packets includes a color portion and a Z portion.

17. The method of claim 16, wherein the data selection control information determines which of the color portion and the Z portion of the selected data packet are included in the selected portion.

18. The method of claim 17, wherein the data selection control information is encoded in the memory command using a predetermined number of bits.

19. The method of claim 16, wherein selecting the selected portion further comprises selecting selected bits from at least one of the color portion and the Z portion.

20. The method of claim 16, wherein packing the selected portion into at least one flit further comprises packing the selected portion into a number of data flits, wherein the number of data flits is determined based on an amount of data in the selected portion.

21. The method of claim 12, wherein the memory array is a dynamic random access memory (DRAM) array that outputs the selected data packet such that all bits included in the selected data packet are provided in parallel on outputs of the DRAM array.

* * * * *